United States Patent [19]
Saitoh

[11] Patent Number: 5,104,603
[45] Date of Patent: Apr. 14, 1992

[54] METHOD OF MANUFACTURING SEALING APPARATUS AND MOLD

[75] Inventor: Takayuki Saitoh, Fukushima, Japan

[73] Assignee: NOK Corporation, Tokyo, Japan

[21] Appl. No.: 389,484

[22] Filed: Aug. 4, 1989

[30] Foreign Application Priority Data

Aug. 5, 1988 [JP] Japan ................. 63-194605
Feb. 15, 1989 [JP] Japan ................. 1-35563

[51] Int. Cl.⁵ .............................. B29C 43/18
[52] U.S. Cl. ................. 264/249; 264/263; 264/266; 264/268; 425/DIG. 47
[58] Field of Search ......... 264/268, 249, 263, 266; 425/DIG. 47

[56] References Cited

U.S. PATENT DOCUMENTS

| | | | |
|---|---|---|---|
| 4,038,359 | 7/1977 | Pendleton | 264/268 |
| 4,171,561 | 10/1979 | Bainard et al. | 425/DIG. 47 |
| 4,406,847 | 9/1983 | O'Neal et al. | 264/266 |
| 4,464,322 | 8/1984 | Butler | 264/138 |
| 4,578,856 | 4/1986 | Butler | 29/451 |
| 4,723,350 | 2/1988 | Kobayashi et al. | 425/DIG. 47 |

*Primary Examiner*—Jan H. Silbaugh
*Assistant Examiner*—Brian J. Eastley
*Attorney, Agent, or Firm*—Armstrong, Nikaido, Marmelstein, Kubovcik & Murray

[57] ABSTRACT

A method of manufacturing a sealing apparatus. A rubber-like elastic material for forming a rubber-like elastic material sealing lip and a resin material for forming a resin sealing lip are placed within a mold for manufacturing a sealing apparatus by effecting vulcanization forming. The mold is clamped with contents placed therein, and the contents are pressurized and heated. During this process, a surface of the resin material is pressed by the forming pressure of the fluidized rubber-like elastic material against a thread formed on an inner wall surface the mold, thereby forming a thread groove on that surface of the resin material pressed against the thread.

5 Claims, 7 Drawing Sheets

METHOD OF MANUFACTURING SEALING APPARATUS AND MOLD

BACKGROUND OF THE INVENTION

The present invention relates to a method of manufacturing a sealing apparatus for sealing the gap between two relatively rotating members, and also relates to a mold suitable for use in the application of the method.

An example of a conventional apparatus of the above-mentioned type is shown in FIG. 1. The sealing apparatus 100 shown in the figure includes a first sealing ring 102 having a first sealing lip 101 formed of a rubber-like elastic material, and a second sealing ring 104 having a second sealing lip 103 formed of a resin material and provided to back up the atmospheric side of the first sealing lip 101. By virtue of this arrangement in which the sealing lip 101 formed of a rubber-like elastic material is backed up by the sealing lip formed of a resin material, the sealing apparatus has an enhanced level of pressure resistance and, hence, is applicable to a sealing portion of, e.g., a compressor or a pump where the sealing apparatus used must exhibit a certain level of pressure resistance.

A conventional sealing apparatus, such as that 100 described above, has hitherto been manufactured by separately forming the first sealing ring 102 having the sealing lip 101 formed of a rubber-like elastic material, and the second sealing ring 104 having the sealing lip 103 formed of a resin, and thereafter by integrally combining the formed sealing rings 102 and 104.

In the above-described prior art, it is sometimes desired that the sealing ability should be enhanced by forming a thread in the resin formed sealing lip 103. In previous practice, when such a thread is to be formed, either a cutting operation employing, e.g., a lathe, or a plastic working such as rolling is conducted. However, this has lead to an increase in the number of processes required to prepare the resin formed sealing lip 103 and, hence, to an increase in production cost.

SUMMARY OF THE INVENTION

The present invention has been accomplished to overcome the problems encountered with the prior art. It is an object of the present invention to provide a method of manufacturing a sealing apparatus with which the process required to form a thread is simplified and which thus ensures an enhanced level of productivity and a reduction in production cost.

It is another object of the present invention to provide a mold suitable for use in the application of the above-described method.

According to the present invention, the above-stated first object of the present invention is achieved by the provision of a method of manufacturing a sealing apparatus comprising the steps of: preparing a mold for manufacturing the sealing apparatus by effecting vulcanization forming, the mold having a thread formed on an inner wall surface thereof; placing within the mold a rubber-like elastic material and a resin material for forming sealing lips of the sealing apparatus; and clamping the mold in such a manner that the rubber-like elastic material is vulcanization formed, thereby forming a portion of the rubber-like elastic material as the sealing lip formed of the rubber-like elastic material, while a surface of the resin material which is to serve as a surface of the sealing lip is pressed against the thread by forming pressure generated during the vulcanization forming, thereby forming a thread groove on that surface of the resin material.

According to another aspect of the present invention, the above-stated second object of the present invention is achieved by the provision of a mold comprising an upper part and a lower part, the lower part having an annular recess allowing the insertion therein of a washer-shaped resin material, the radially inner wall surface of the recess having a thread cut at a position allowing the contact of the resin material with the thread.

DESCRIPTION OF THE PREFERRED EMBODIMENTS

Figure 1:
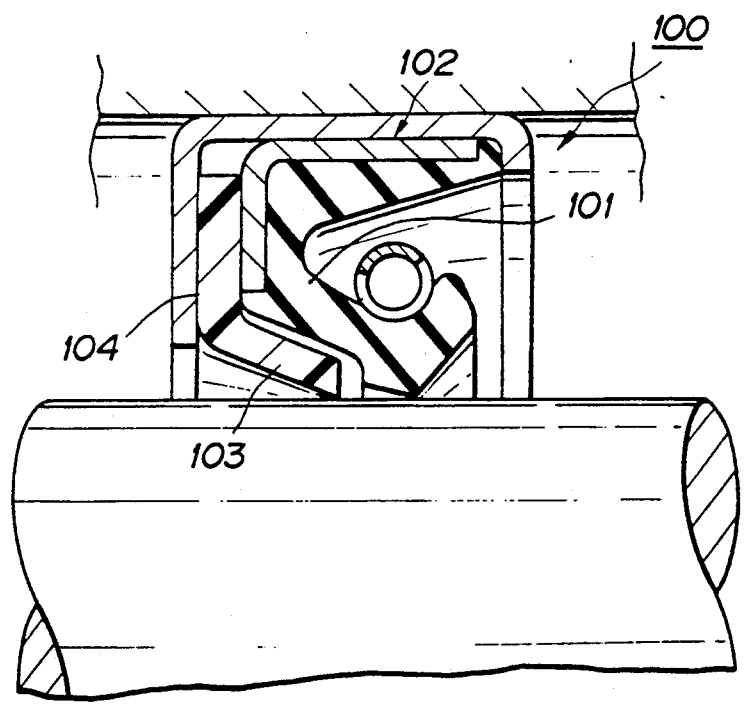
FIG. 1 is a sectional view of essential parts of a conventional sealing apparatus, taken through a plane including the axis of the associated rotary shaft.
Figure 2:
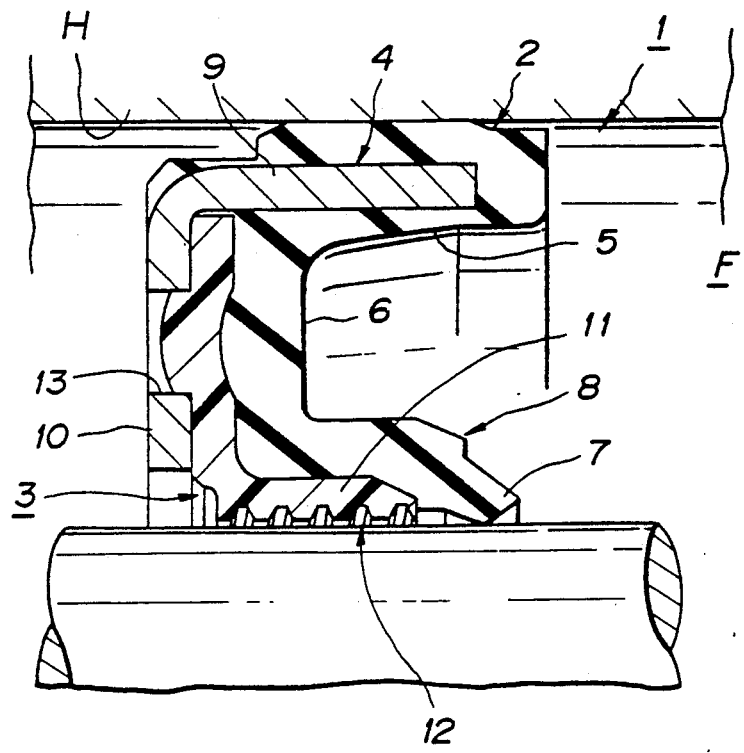
FIG. 2 is a sectional view similar to FIG. 1, showing an example of a sealing apparatus manufactured by a first embodiment of the method of the present invention.

The present invention will now be described with reference to the accompanying drawings. FIG. 2 shows a sealing apparatus manufactured by a first embodiment of the method of the present invention.

The sealing apparatus generally designated as 1 in the figure mainly comprises the combination of a first sealing ring 2 formed of a rubber-like elastic material and disposed on the sealed fluid F side, a second sealing ring 3 formed of, e.g., polytetrafluoroethylene (PTFE), and a back-up ring 4 formed of a metal, the second sealing ring 3 being held in place between the first sealing ring 2 and the back-up ring 4.

The first sealing ring 2 comprises an outer cylindrical portion 5 capable of being fitted on the inner periphery of the associated housing H, an annular supporting portion 6 extending radially inwardly from an intermediate portion of the outer cylindrical portion 5, and a sealing lip 8 extending toward the sealed fluid F side from the supporting portion 6. The lip tip 7 of the sealing lip 8 is capable of coming into close sealing contact with the surface of the associated shaft, and thus forming a sealing portion.

The first sealing ring 2 is assembled at an elevated temperature in such a manner as to be integrated with the back-up ring 4. The back-up ring 4 comprises a cylindrical portion 9 having an L-shaped section and extending into the outer cylindrical portion 5 of the first sealing ring 2 to serve as a core for the outer cylindrical portion 5, and a flange portion 10 extending radially inwardly from that end portion of the cylindrical portion 9 which is on the atmospheric side. The second sealing ring 3 is held in place between the flange portion 10 of the back-up ring 4 and the supporting portion 6 of the first sealing ring 2.

The second sealing ring 3 is a member generally plate-shaped and formed of a resin material such as PTFE, the radially inner side of the member being bent into a cylindrical shape toward the sealed fluid F side in such a manner as to form a resin formed sealing lip 11. The tip of the resin formed sealing lip 11 reaches a tip portion of the sealing lip 8 of the first sealing ring 2 so as to be able to support force applied to the sealing lip 8 of the first sealing ring 2.

The resin formed sealing lip 11 has a sealing sliding surface disposed on the surface of the associated shaft. This sealing sliding surface has a thread groove 12 formed approximately over the full axial length of the sealing lip 11.

A plurality of bores 13 are provided at a portion where the second sealing ring 3 is in contact with the back-up ring 4, i.e., at the flange portion 10 of the back-up ring 4, for the purpose of preventing relative rotation of the second sealing ring 3 and thus fixing the ring 3 in place. Specifically, the plurality of bores 13 are formed at a radially central portion of the flange portion 10 of the back-up ring 4 a predetermined intervals in the circumferential direction. The bores 13 allow a part of the second sealing ring 3 to enter the bores 13 during vulcanization forming.

Next, descriptions will be given of the method of manufacturing the sealing apparatus having the above-described construction.

Figure 3:
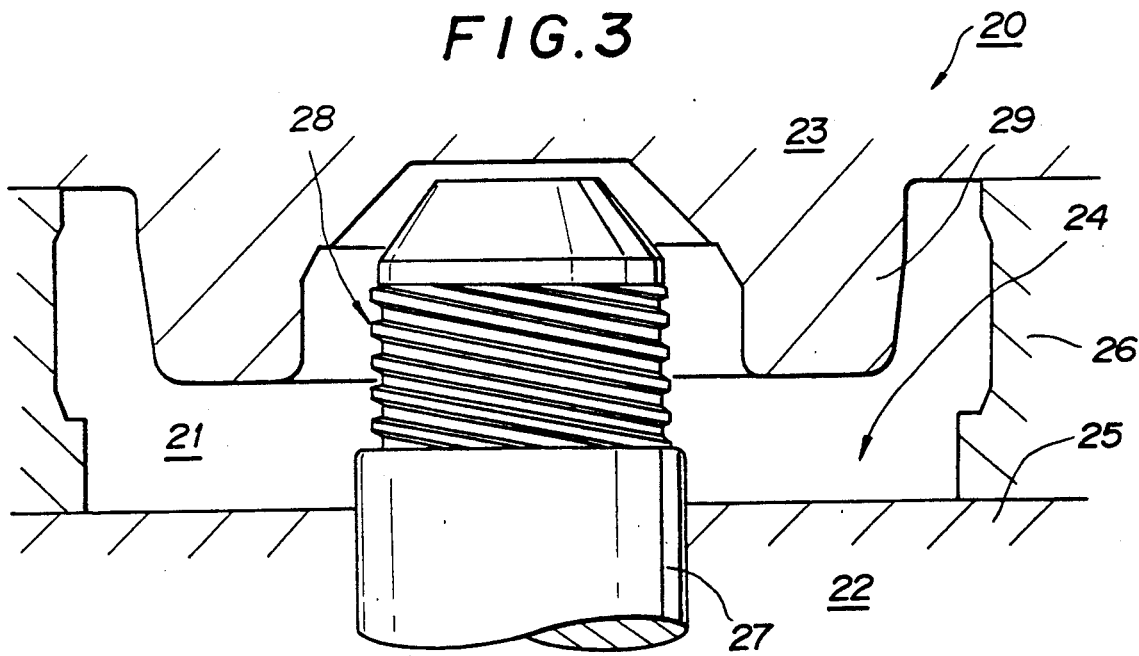
FIG. 3 is a vertical sectional view of a mold used in the first embodiment of the method of the present invention.

The sealing apparatus 1 is manufactured using a mold 20, shown in FIG. 3. The mold 20 mainly comprises a lower mold 22 and an upper mold 23.

The upper surface of the lower part 22 defines an annular recess 24 having a generally rectangular section and opening upwardly. The annular recess 24 allows the insertion therein of a resin material B having a washer-like shape and having its radially inner portion B1 bent in the axial direction. The lower part 22 comprises a first piece 25 defining the bottom surface of the recess 24, a second piece 26 defining the radially outer wall surface of the recess 24, and a core piece 27 defining the radially inner wall surface of the recess 24, into which pieces 25 to 27 the lower part 22 is divided.

The outer peripheral surface of the core piece 27 defining the radially inner wall surface of the recess 24 has a thread 28 cut therein, the thread 28 corresponding to the thread groove 12 formed in the resin formed sealing lip 11 of the apparatus 1. The outer peripheral surface of the core piece 27 allows the inner periphery of the bent portion B1 of the washer-shaped resin material B to come into contact therewith.

On the other hand, the lower surface of the upper part 23 has an annular projecting portion 29 capable of being inserted into the recess 24 of the lower part 22. When the mold 20 is clamped, an annular cavity 21 is formed between the projecting portion 29 and the inner surface of the recess 24, the cavity 21 having a U-shaped section corresponding to the section of the first sealing ring 2.

The sealing apparatus 1 is manufactured using the mold 20 in the following manner.

Before the vulcanization forming of the first sealing ring 2, a metal ring which is to serve as the back-up ring 4 as well as a washer-shaped resin material B which is to be formed into the resin formed second sealing ring 3 are prepared by suitably forming them.

Subsequently, the back-up ring 4 and the resin material B are superimposed in this order within the recess 24 of the lower part 22 of the mold 20 while the mold 20 is in its open state (see FIG. 4). With this condition, the inner periphery of the bent portion B1 of the resin material B is maintained in a state of being in contact with the outer periphery of the core piece 27 defining the radially inner wall surface of the recess 24.

Figure 4:
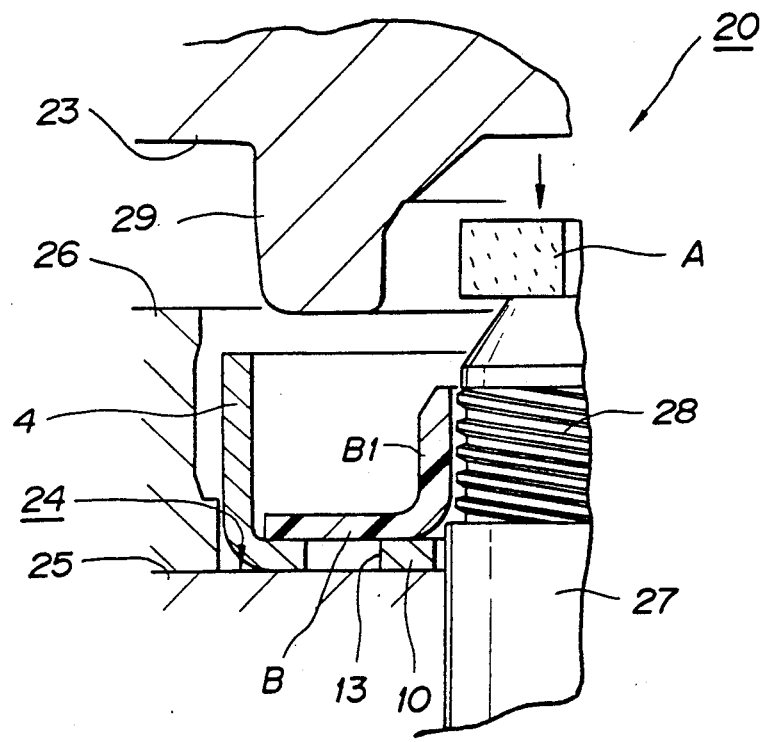
FIGS. 4 and 5 are fragmentary vertical sectional views of the mold shown in FIG. 3, which are used to explain processes of the method by which the sealing apparatus shown in FIG. 2 is manufactured, FIG. 4 showing a state before vulcanization forming in which the mold is open, FIG. 5 showing a state during vulcanization forming.
Figure 5:
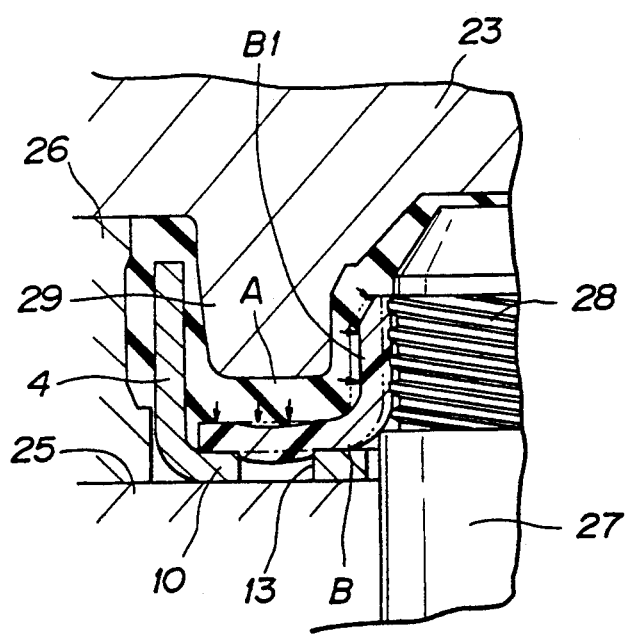

Furthermore, a rubber-like elastic material A to be formed into the first sealing ring 2 is placed, as shown in FIG. 4. The mold 20 is clamped, and the contents of the mold 20 are heated and pressurized. During this process, the bent portion B1 of the resin material B softened by heat is pressed against the threaded surface of the core piece 27 by pressure generated by the fluidized rubber-like elastic material A (see FIG. 5 where arrows indicate the direction of pressure). As a result, the configuration of the thread 28 cut in the surface of the core piece 27 is transferred to the inner periphery of the bent portion B1 of the resin material B.

Also during this process, since bores 13 ar formed in the flange portion 10 of the back-up ring 4, a part of the resin material B enters the bores 13. As a result, the resin material B and the back-up ring 4 are firmly fixed together.

Figure 6:
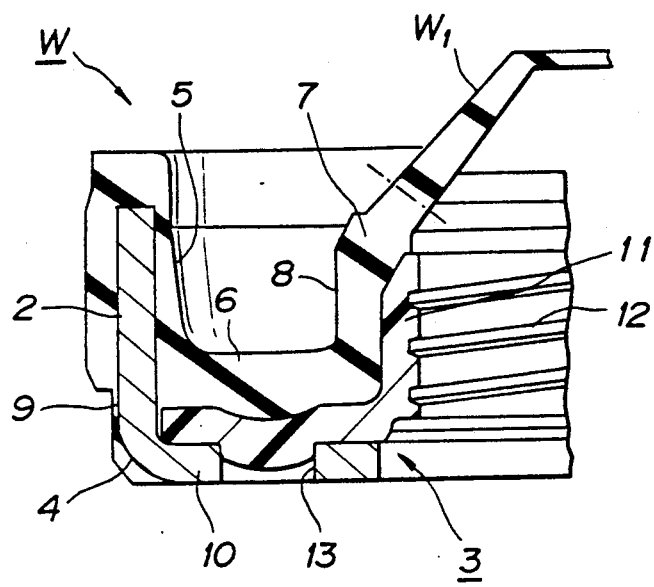
FIG. 6 is a fragmentary sectional view of a product in a state of having been subjected to vulcanization forming.

After the completion of the vulcanization forming, the mold 20 is opened, and a product W formed is taken out of the mold 20. A superfluous portion W1 of the product W which extends from the portion corresponding to the tip of the sealing lip 8 is cut off, as indicated by one-dot-chain line in FIG. 6, thereby completing the sealing apparatus.

With the above-described method, since the thread groove 12 of the sealing lip 11 is formed by pressing the pertinent portion of the resin material B against the thread 28 of the mold 20 during vulcanization forming, the thread groove 12 can be formed with its depth, configuration, etc. being accurately determined, thereby making it possible to select an optimum groove configuration.

FIGS. 7 through 11 relate to a second embodiment of the present invention. In the following descriptions, the same reference numerals are used to denote the same component parts as those described before in relation to the first embodiment.

Figure 7:
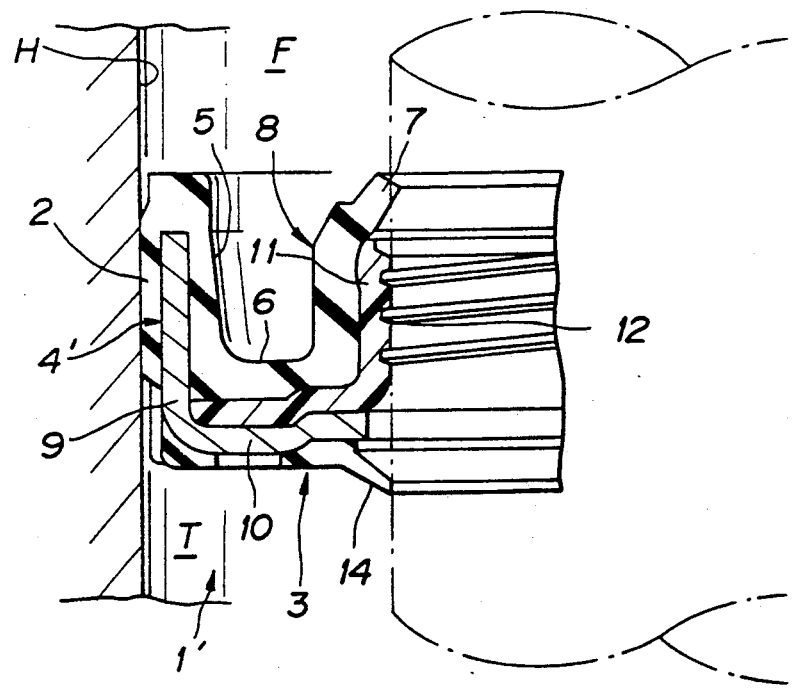
FIG. 7 is a sectional view similar to FIG. 1, showing an example of a sealing apparatus manufactured by a second embodiment of the method of the present invention.

FIG. 7 shows a sealing apparatus 1' manufactured by the second embodiment of the method of the present invention. Descriptions will be given solely of the different arrangement of the second embodiment from the first embodiment. The apparatus 1' is distinguished from the apparatus 1 manufactured by the method of the first embodiment in that a dust lip 14 is provided at the radially inner end of a back-up ring 4', and that no relative rotation preventing bores 13 are formed in the flange portion 10 of the back-up ring 4'.

Figure 8:
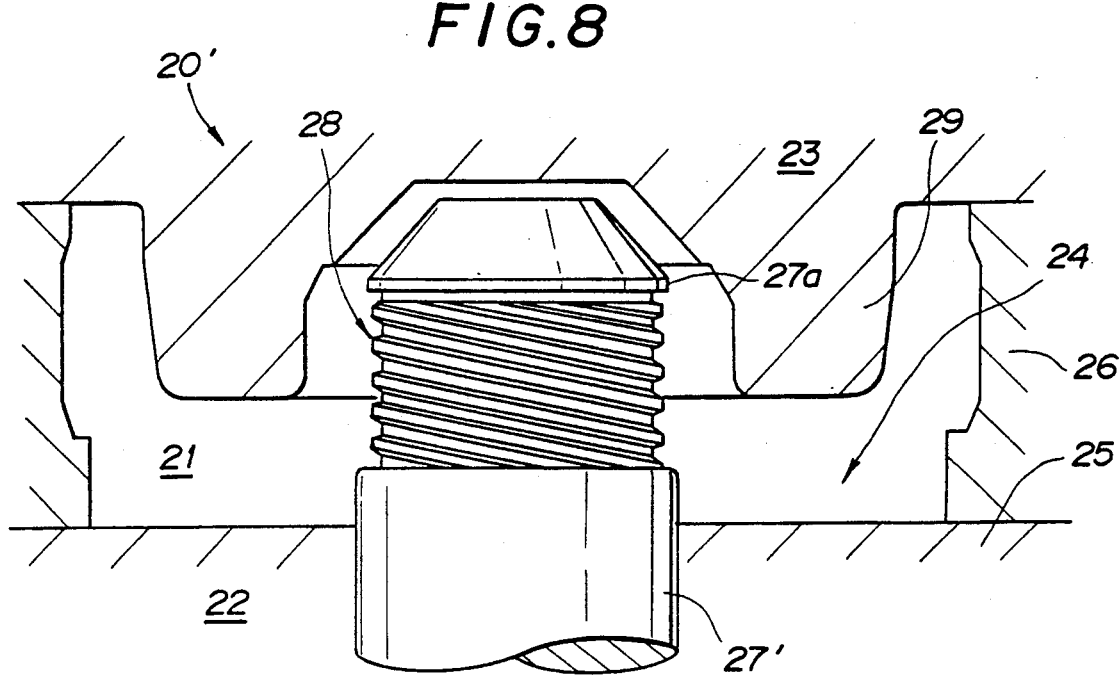
FIG. 8 is a vertical sectional view of a mold used to manufacture the sealing apparatus shown in FIG. 7.

FIG. 8 shows a mold 20' used in the manufacture of the sealing apparatus 1' shown in FIG. 7. The mold 20' is distinguished from the mold 20 shown in FIG. 3 in that an annular projection 27a having a diameter larger than that of the thread 28 is formed on the outer periphery of the tip portion of a core piece 27'. Other arrangements of the mold 20' are the same as those of the mold 20 shown in FIG. 3, and descriptions of these arrangements will be omitted.

Figure 9:
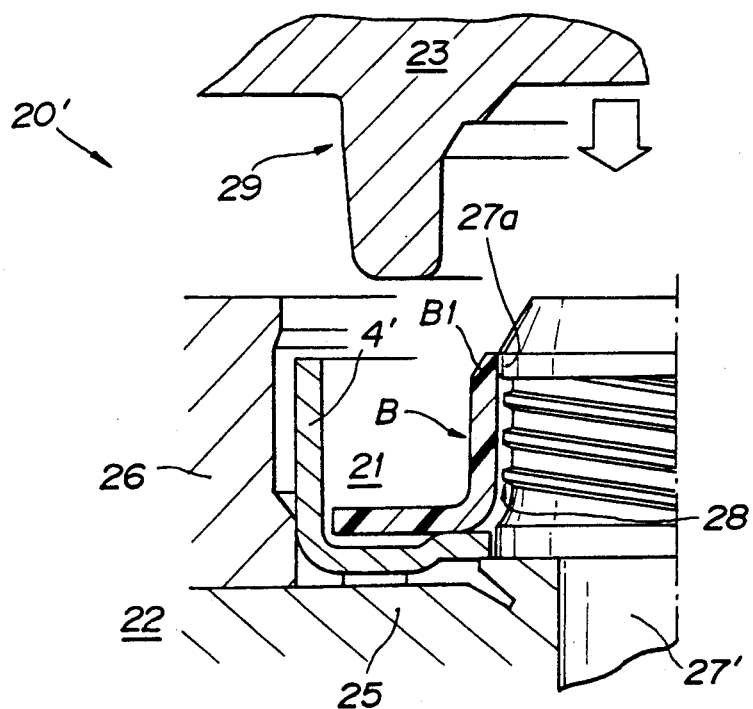
FIGS. 9 to 11 are fragmentary vertical sectional views of the mold shown in FIG. 8, which are used to explain processes of the method by which the sealing apparatus shown in FIG. 7 is manufactured, FIG. 9 showing a state before vulcanization forming in which the mold is open, FIG. 10 showing a state in which the mold is closed, FIG. 11 showing a state during vulcanization forming.
Figure 10:
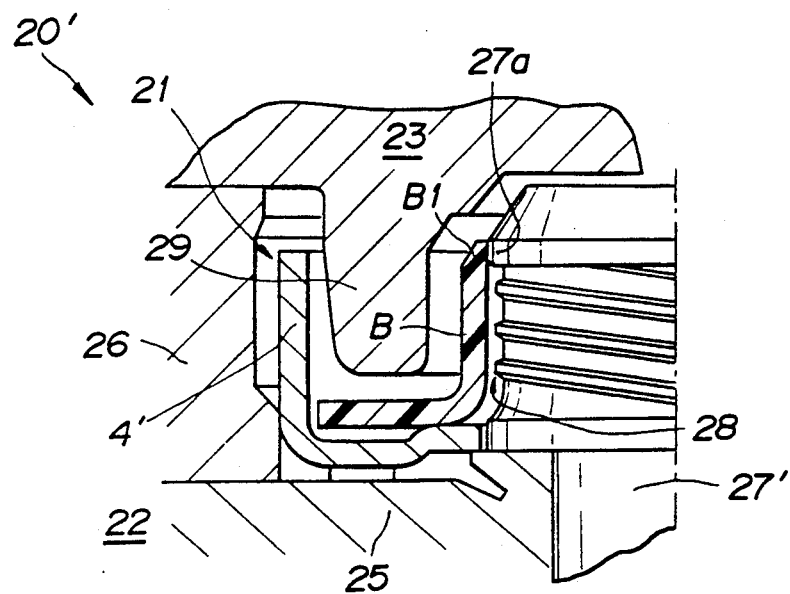

The apparatus 1' is manufactured using the mold 20' in the following manner. Before the vulcanization forming of the first sealing ring 2, a metal ring which is to serve as the back-up ring 4' as well as an annular resin material B which is already formed with an L-shaped section and which is to serve as the resin formed second sealing ring 3 are prepared. Subsequently, the back-up ring 4' and the resin material B are superimposed in this order within the recess 24 of the lower part 22 of the mold 20' while the mold 20' is in its open state, as shown in FIG. 9. With this condition, the inner periphery of a bent portion B1 of the annular resin material B is maintained in a state of being in close contact with the annular projection 27a on the outer periphery of the core piece 27'.

Figure 11:
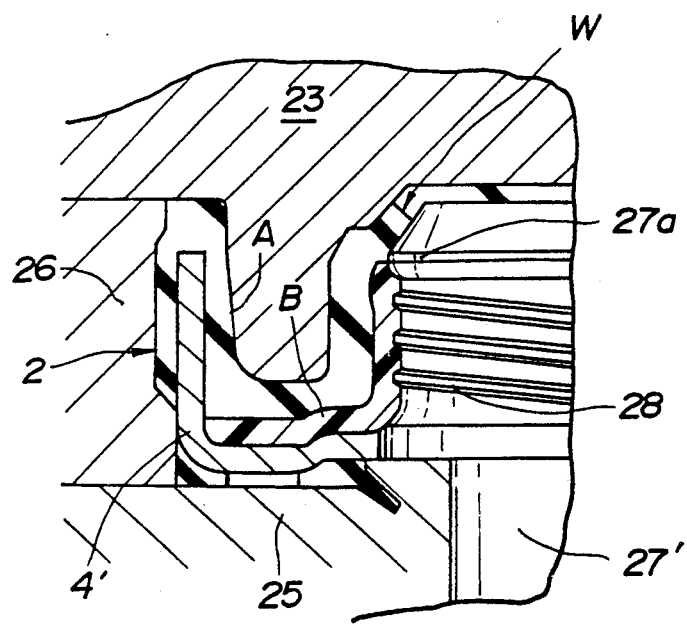

Furthermore, a rubber-like elastic material A to be formed into the first sealing ring 2 is placed. The mold 20' is clamped, and the contents of the mold 20' are heated and pressurized. During this process, the bent portion B1 of the resin material B softened by heat is pressed against the surface of the core piece 27' by pressure generated by the fluidized rubber-like elastic material A, as shown in FIG. 11. As a result, the configuration of the thread 28 cut in the surface of the core piece 27' is transferred to the inner periphery of the bent portion B1 o the annular resin material B.

With the method of the second embodiment, since the annular projection 27a of the core piece 27' is kept in close contact with a portion of the inner periphery of the bent portion B1 of the annular resin material B during mold clamping, it is possible to prevent any part of the rubber-like elastic material A from penetrating into the gap between the thread 28 and the resin material B and, hence, to prevent the occurrence of errors in the formation of threads.

A third embodiment of the present invention will be described with reference to FIGS. 12 and 13. In this description, the same component parts as those described in relation to the first embodiment will be denoted by the same reference numerals, and descriptions will be given solely concerning different component parts. The third embodiment is distinguished in that a resin material B' is used, which is, when placed within the mold 20°, simply shaped like a flat washer and has not been subjected yet to the formation of a bent portion corresponding to the sealing lip 11.

Figure 12:
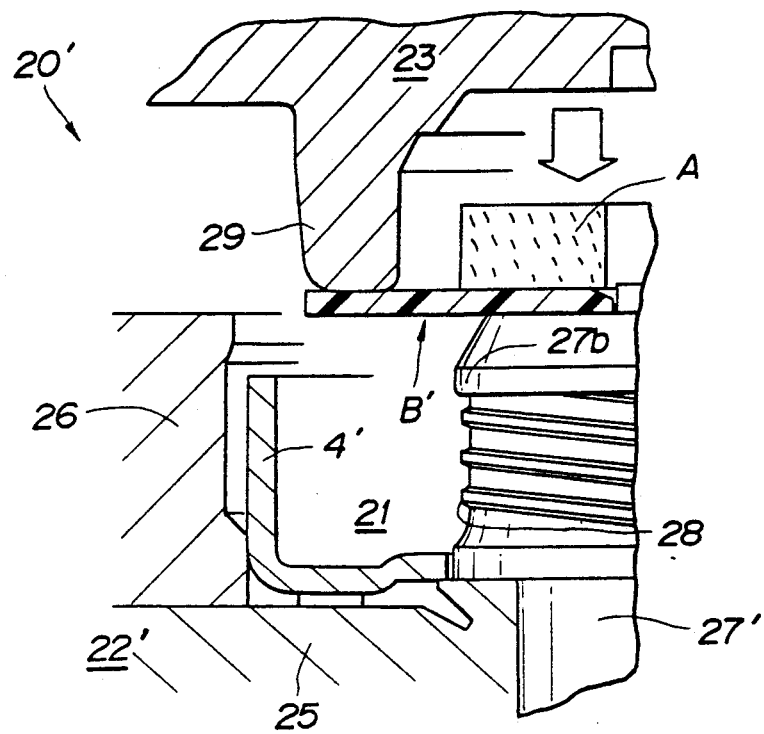
FIGS. 12 and 13 are vertical sectional views of a mold used in a third embodiment of the method of the present invention, which are used to explain processes of the method, FIG. 12 showing a state before vulcanization forming in which the mold is open, FIG. 13 showing a state in the course of vulcanization forming.
Figure 13:
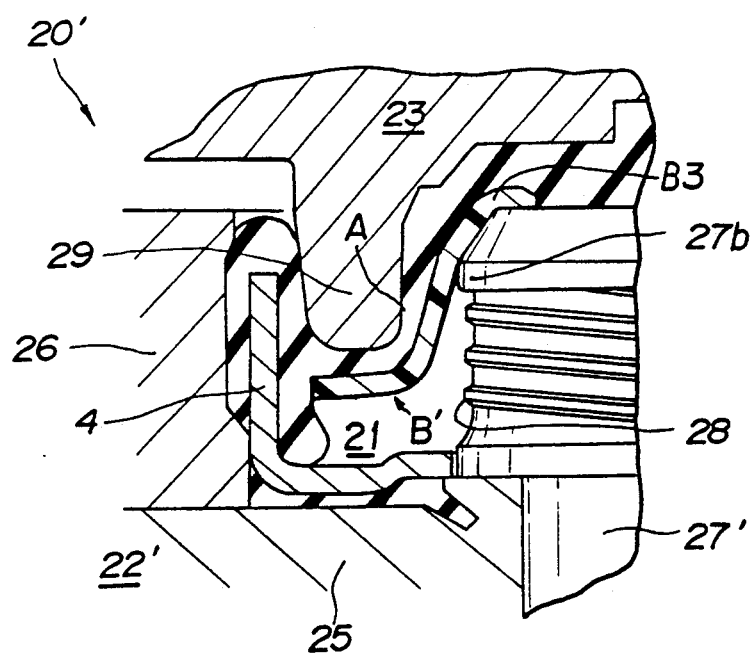

As shown in FIG. 12, while the mold 20' is open, a metal back-up ring 4' is placed within the recess 24, and the resin material B' as well as a rubber-like elastic material A are superimposed in this order on the upper surface of the core piece 27' of the lower part 22'.

Thereafter, the mold 20' is clamped, and the contents of the mold 20' are pressurized and heated. During this process, the resin material B' softened by heat is pressed downward by forming pressure generated by the fluidized rubber-like elastic material A, as shown in FIG. 13. Also during this process, a radially inner end portion B3 of the material B' is pressed against the radially inner wall surface 27b of the core piece 27' in such a manner as to be spread on the surface 27b and bent into a cylindrical shape extending axially of the core piece 27', the thus bent portion B3 corresponding to the resin formed sealing lip 11. Simultaneously, the sealing lip 11 corresponding portion is pressed against the thread 28 of the core piece 27' so as to be formed with the thread groove 12. Since other arrangements and operation of the third embodiment is the same as that of the above-described second embodiment, descriptions thereof will be omitted.

As has been described above, with the method in accordance with the present invention, a thread groove is formed in a resin formed sealing lip by utilizing pressure generated during the vulcanization forming of a rubber-like elastic material formed sealing lip. By virtue of this arrangement, it is possible to reduce the number of processes required, by eliminating the process conventionally performed to form a thread groove in the resin formed sealing lip. This enables production efficiency to be enhanced, and manufacturing cost to be lowered.

If pressure generated during vulcanization forming is also utilized to form a sealing lip by bending a radially inner end portion of a washer-shaped resin material, this is advantageous because the bending of the resin formed sealing lip can be performed simultaneously with the thread groove forming, thereby enabling a further enhancement of production efficiency.

With the mold of the present invention, since pressure generated by a rubber-like elastic material during the vulcanization thereof can be effectively applied to a resin material, it is possible to subject the resin material to thread forming with a very simple structure.

If an annular projection capable of coming into close contact with a portion of the resin material is formed at an upper end portion of the inner wall surface partially defining a recess of a lower mold part, it is possible to prevent any part of the fluidized rubber-like elastic material from penetrating into the gap between the inner peripheral surface of the resin material and the mating inner wall surface of the recess. Thus, it is possible to form a thread groove in the resin formed sealing lip with a high degree of precision.

What is claimed is:

1. A method of manufacturing a sealing apparatus comprising the steps of:

preparing a mold for manufacturing the sealing apparatus by effecting vulcanization forming, said mold having threads formed on an inner wall surface thereof;

placing within said mold a rubber-like elastic material and a resin material for providing sealing lips of the sealing apparatus; and clamping said mold in such a manner that said rubber-like material is pressurized and vulcanization formed thereby forming a portion of said rubber-like elastic material as a radially-inner sealing lip, so that the radially-inner sealing lip of the rubber-like elastic material overlaps and extends beyond the sealing lip of the resin material while a radially-inner surface of said resin material which is to serve as a surface of the sealing lip is pressed against said threads by forming pressure generated by fluidized rubber-like elastic material during the vulcanization forming, thereby forming a thread groove on that surface of said resin material; and cutting off a superfluous portion of molded rubber-like elastic material which extends from the radially-inner sealing lip formed of said rubber-like elastic material.

2. A method of manufacturing a sealing apparatus according to claim 1, wherein, before the vulcanization forming, said resin material has a portion already formed as the sealing lip.

3. A method of manufacturing a sealing apparatus according to claim 1, wherein said resin material is washer-shaped, a radially inner end portion of said resin material being bent into a cylindrical shape by forming pressure generated during the vulcanization forming so as to be formed into the sealing lip.

4. A method of manufacturing a sealing apparatus according to any of claims 1, 2 or 3, wherein a back-up ring is placed within said mold together with said resin material and said rubber-like elastic material so that said back-up ring will be formed integrally with said materials.

5. A method of manufacturing a sealing apparatus according to claim 4, wherein said back-up ring has a bore formed therein, said bore allowing the entrance therein of a part of said resin material under forming pressure generated during the vulcanization forming, thereby allowing the integration of said back-up ring and said resin material.

* * * * *